US009574952B2

(12) United States Patent
Schintee

(10) Patent No.: US 9,574,952 B2
(45) Date of Patent: Feb. 21, 2017

(54) PRESSURE DETECTION DEVICE

(75) Inventor: Liviu Schintee, Carrington (AU)

(73) Assignee: Custom Fluid Power Pty Ltd., Carrington (AU)

( * ) Notice: Subject to any disclaimer, the term of this patent is extended or adjusted under 35 U.S.C. 154(b) by 1024 days.

(21) Appl. No.: 13/809,726

(22) PCT Filed: Mar. 30, 2011

(86) PCT No.: PCT/AU2011/000369
§ 371 (c)(1),
(2), (4) Date: Mar. 8, 2013

(87) PCT Pub. No.: WO2012/006656
PCT Pub. Date: Jan. 19, 2012

(65) Prior Publication Data
US 2013/0158896 A1 Jun. 20, 2013

(30) Foreign Application Priority Data

Jul. 12, 2010 (AU) ................ 2010903070

(51) Int. Cl.
G01L 11/00 (2006.01)
G06F 15/00 (2006.01)
(Continued)

(52) U.S. Cl.
CPC .............. *G01L 1/04* (2013.01); *G01L 1/005* (2013.01); *G01L 1/16* (2013.01); *G01L 1/26* (2013.01);
(Continued)

(58) Field of Classification Search
CPC .......... G06F 15/00; G01L 1/00; G01L 1/0001; G01L 1/04; G01L 1/004; G01L 1/005; G01L 1/16; G01L 9/0026; G01L 11/006; G01L 11/008; G01L 11/004
(Continued)

(56) References Cited

U.S. PATENT DOCUMENTS 4,500,275 A * 2/1985 Ruhl .................... B23Q 1/0063
249/139
5,031,460 A 7/1991 Kanenobu et al.
(Continued)

FOREIGN PATENT DOCUMENTS

AU 2011279529 3/2011
AU 2011279529 A1 1/2013
(Continued)

OTHER PUBLICATIONS

International Search Report was mailed on May 10, 2011 for International Application No. PCT/AU2011/000369, which was filed on Mar. 30, 2011 and published as WO 2012/006656 on Jan. 19, 2012 (Applicant—Custom Fluid Power PTY Ltd, et al) (3 pages).

(Continued)

*Primary Examiner* — Sujoy Kundu
*Assistant Examiner* — Lynda Dinh
(74) *Attorney, Agent, or Firm* — Ballard Spahr LLP

(57) ABSTRACT

A pressure testing device for calculating a pressure in a flexible line comprises a housing unit, a force sensor mounted on the housing unit and a clamp assembly having a clamp mounted on the housing unit. The clamp is operable to compress the flexible line against the force sensor by a predetermined degree of deformation of the flexible line. The device includes a displacement sensor adapted to measure a displacement of the clamp. The device also includes a controller having a processor in communication with the force sensor and the displacement sensor, and a memory unit containing stored data. At the predetermined degree of deformation of the flexible line, the processor compares a first signal from the force sensor and a second signal from the displacement senor with the stored data to estimate the pressure within the flexible line.

22 Claims, 3 Drawing Sheets

(51) Int. Cl.
- *G01L 1/04* (2006.01)
- *G01L 17/00* (2006.01)
- *G01L 1/00* (2006.01)
- *G01L 1/16* (2006.01)
- *G01L 9/00* (2006.01)
- *G01L 1/26* (2006.01)

(52) U.S. Cl.
CPC ........... *G01L 9/0001* (2013.01); *G01L 9/0026* (2013.01); *G01L 11/008* (2013.01); *G01L 17/005* (2013.01); *G06F 15/00* (2013.01)

(58) Field of Classification Search
USPC .......................................................... 702/41
See application file for complete search history.

(56) References Cited

U.S. PATENT DOCUMENTS

| | | | | |
|---|---|---|---|---|
| 5,437,282 | A * | 8/1995 | Koger | A61B 8/12 600/463 |
| 7,571,650 | B2 * | 8/2009 | McKinnell | H04R 17/02 361/283.4 |
| 2002/0013642 | A1 * | 1/2002 | Choi | B23K 3/0623 700/275 |
| 2004/0075498 | A1 * | 4/2004 | Matsui | G01L 9/085 330/174 |
| 2005/0072242 | A1 * | 4/2005 | Fandrey | G01L 19/0007 73/706 |
| 2006/0087314 | A1 * | 4/2006 | Zhu | G01D 5/165 324/207.17 |

FOREIGN PATENT DOCUMENTS

| | | |
|---|---|---|
| DE | 19747254 A1 | 5/1999 |
| EP | 2011806124 | 3/2011 |
| EP | 2593763 A1 | 5/2013 |
| WO | WO-91/16609 A1 | 10/1991 |
| WO | WO/2012/006656 | 3/2011 |
| WO | WO-2012/006656 A1 | 1/2012 |

OTHER PUBLICATIONS

Written Opinion of the International Searching Authority mailed on May 10, 2011 for International Application No. PCT/AU2011/000369, which was filed on Mar. 30, 2011 and published as WO 2012/006656 on Jan. 19, 2012 (Applicant—Custom Fluid Power PTY Ltd, et al) (4 pages).

International Preliminary Report on Patentability was issued on Jan. 15, 2013 for International Application No. PCT/AU2011/000369, which was filed on Mar. 30, 2011 and published as WO 2012/006656 on Jan. 19, 2012 (Applicant—Custom Fluid Power PTY Ltd, et al) (5 pages).

* cited by examiner

PRESSURE DETECTION DEVICE

CROSS-REFERENCE TO RELATED APPLICATIONS

The present application is a U.S. National Phase Application of International Application No. PCT/AU2011/000369, filed Mar. 30, 2011, which claims priority to Australian Patent Application No. 2010903070, filed Jul. 12, 2010, all of which applications Are incorporated herein fully by this reference.

FIELD OF THE INVENTION

The present invention relates to a pressure detection device. In particular, the present invention relates to portable device for detecting the pressure in flexible hydraulic and pneumatic hoses.

BACKGROUND OF THE INVENTION

There are many applications where it is desirable to test or measure the internal pressure within a flexible hydraulic or pneumatic line. This may be for safety purposes, or for other reasons such as accuracy of measurement of flow conditions.

In both underground and open-cut mining applications hydraulic lines are commonly used on a variety of equipment ranging from jacking and roof bolting equipment to excavating and long wall shearing devices. As such, hydraulic motors, pumps and pistons provide an integral part of most mining environments. In a similar way, hydraulic equipment is widely used by other industries such as forestry, farming and construction.

At certain stages of operation of hydraulic machinery, it may become necessary to depressurise and decouple a hydraulic line. During such a process it is important that the hydraulic line is firstly depressurised, to reduce the risk of any personnel being injured by the high pressure hydraulic fluid. Despite safety protocols, accidents still occur. The residual pressure in the hydraulic line may still be too high in some instances, even after depressurisation has been attempted. Alternatively, technicians often incorrectly assume that a line has a low pressure or no pressure.

Previously, hydraulic couplings utilised corresponding male and female threaded members. The threaded couplings meant that when a user believed the hydraulic line to have been depressurised, by slowly unscrewing the thread, the hydraulic fluid would leak immediately after the seal was broken, indicating to the user if the line still contained high pressure fluid.

However; in newer machinery, hydraulic lines are typically coupled together with snap lock type fittings. Whilst snap lock fittings are fast to connect and disconnect, they also provide the disadvantage of being very dangerous if they are disconnected while the line pressure is still too high. Because the snap lock fitting is fast to disconnect, there are incidents of personnel being injured and killed by the hose whipping around, and either striking a person, or spraying the person with hydraulic fluid which may be at very high pressures, and temperatures.

There are known invasive devices for testing the pressure in a hydraulic line. These devices include deadweight pressure testers, pressure transducers and hydraulic multi-meters. However, these devices are all invasive and as such require connection to the hydraulic line through valves, ports and other means. A disadvantage with these devices is that they are not portable and only provide a pressure reading at a given location in the hydraulic circuit. A further disadvantage is that it is not always possible to connect an invasive testing device to a hydraulic circuit. For example, in a complex hydraulic circuit with long lines, not all lines are provided with a test point to allow pressure measurement.

There are known non-invasive devices for testing fluid flow at a specific point in a hydraulic line. Examples of such devices include strain gauges which require prior installation into the line and calibration. A disadvantage of using such devices is that they often do not provide a sufficient degree of precision, and they tend to be expensive and complex to operate.

Other fluid pressure testing devices include metal discs moving within the electromagnetic field of an energised coil to sense pressure changes. Such devices generally use a test chamber separated into two parts by a flexible diaphragm. However, these devices are intended for medical applications and other such uses where the fluid pressure in the line is relatively small.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a pressure testing device for calculating a pressure in a flexible line, the device comprising:
  a housing unit;
  a force sensor mounted on the housing unit;
  a clamp assembly having a clamp mounted on the housing unit, the clamp being operable to compress the flexible line against the force sensor by a predetermined degree of deformation of the flexible line;
  a displacement sensor adapted to measure a displacement of the clamp; and
  a controller having:
    i) a processor in communication with the force sensor and the displacement sensor;
    ii) a memory unit containing stored data;
  wherein at the predetermined degree of deformation of the flexible line, the processor compares a first signal from the force sensor and a second signal from the displacement senor with the stored data to estimate the pressure within the flexible line.

The pressure testing device preferably further includes an output device, wherein the controller is adapted to send an output signal to the output device based on an estimated pressure within the flexible line.

The output device preferably provides a first output corresponding to a low pressure, a second output corresponding to a high pressure, and a third output corresponding to an error, indicating that retesting is required.

The force sensor preferably includes a probe coupled with a transducer.

The transducer is preferably a piezoelectric transducer.

The transducer is preferably in communication with an amplifier which converts an electric charge into an electric signal, proportional to a force applied to the probe.

The amplifier is preferably in communication with the controller.

The displacement sensor preferably includes a linear potentiometer.

The linear potentiometer preferably includes a body mounted on the housing unit, and a sliding arm in engagement with a moving portion of the clamp.

The linear potentiometer preferably acts as a voltage divider to measure the distance between clamp and the probe.

The predetermined degree of deformation of the flexible line is preferably about 10 percent of the outer diameter of the flexible line.

The damp assembly preferably includes:
a shaft having proximal and distal ends;
a handle connected to the proximal end; and
a clamp plate connected to the distal end,
wherein the handle is rotatable to selectively vary the distance between the clamp plate and the force sensor.

The shaft preferably includes a primary shaft and a secondary shaft, the primary shaft extending between the handle and a puller block, and the secondary shaft extending between the puller block and the clamp plate.

The primary shaft is preferably threadingly connected to the puller block such that rotation of the handle causes the puller black to move longitudinally within the housing unit.

The sliding arm is preferably in engagement with the puller block.

The pressure testing device further preferably comprises a micro-switch in contact with the puller block, the micro-switch being adapted to turn on the device when the puller block moves longitudinally.

The pressure testing device preferably further comprises a second force sensor mounted on the housing unit.

The second force sensor is preferably a resistive strain sensor.

In a second aspect, the present invention provides a pressure testing device for estimating a pressure within a flexible line, the device comprising:
a clamp, adapted to compress the flexible line;
a displacement sensor adapted to measure an outer diameter of the flexible line and output a stop signal when the outer diameter of the flexible line has been compressed by a predetermined percentage;
a force sensor adapted to measure a force applied by the clamp against an outer wall of the flexible line and output a force signal;
a processor adapted to compare the force signal with a database of values to estimate whether an internal pressure is safe or unsafe; and
a display in communication with the processor and adapted to provide an indication of safe or unsafe internal pressure.

In a third aspect, the present invention provides a pressure testing device for estimating a pressure within a flexible line, the device comprising:
a clamp, adapted to compress the flexible line;
a displacement sensor adapted to measure a change in outer diameter of the flexible line and output a displacement signal;
a force sensor adapted to measure a force acting on an outer wall of the, flexible line and output a force signal;
a processor adapted to compare the force signal and the displacement signal with a database of stored values to estimate an internal pressure within the flexible line and produce an output.

In a fourth aspect, the present invention provides a pressure testing device for estimating a pressure within a flexible line, the device comprising:
a clamp, adapted to compress the flexible line;
a displacement sensor adapted to measure a change in outer diameter of the flexible line and output a displacement signal;
a force sensor adapted to measure a force acting on an outer wall of the flexible line and output a force signal;
wherein the force sensor and the displacement sensor are in communication with a processor adapted to compare the force signal and the displacement signal with a database of stored values to estimate an internal pressure within the flexible line and produce an output.

In a fifth aspect, the present invention provides a method of calculating a pressure in a flexible line, the method including the steps of:
calculating an outer diameter of the flexible line with a displacement sensor;
compressing the line with a clamp against a force sensor by a predetermined degree of deformation of the flexible line;
sending a first force signal from the force sensor to a controller;
sending a second displacement signal from the displacement sensor to the controller;
comparing the first force signal and the second displacement signal with stored data to estimate the pressure within the flexible line.

The step of compressing the line preferably includes a user manually actuating the clamp.

The method preferably further includes the step of sending an output to the user to indicate when the predetermined degree of deformation has occurred.

The predetermined degree of deformation is preferably about 10 percent of the outer diameter of the flexible line.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

Figure 1:
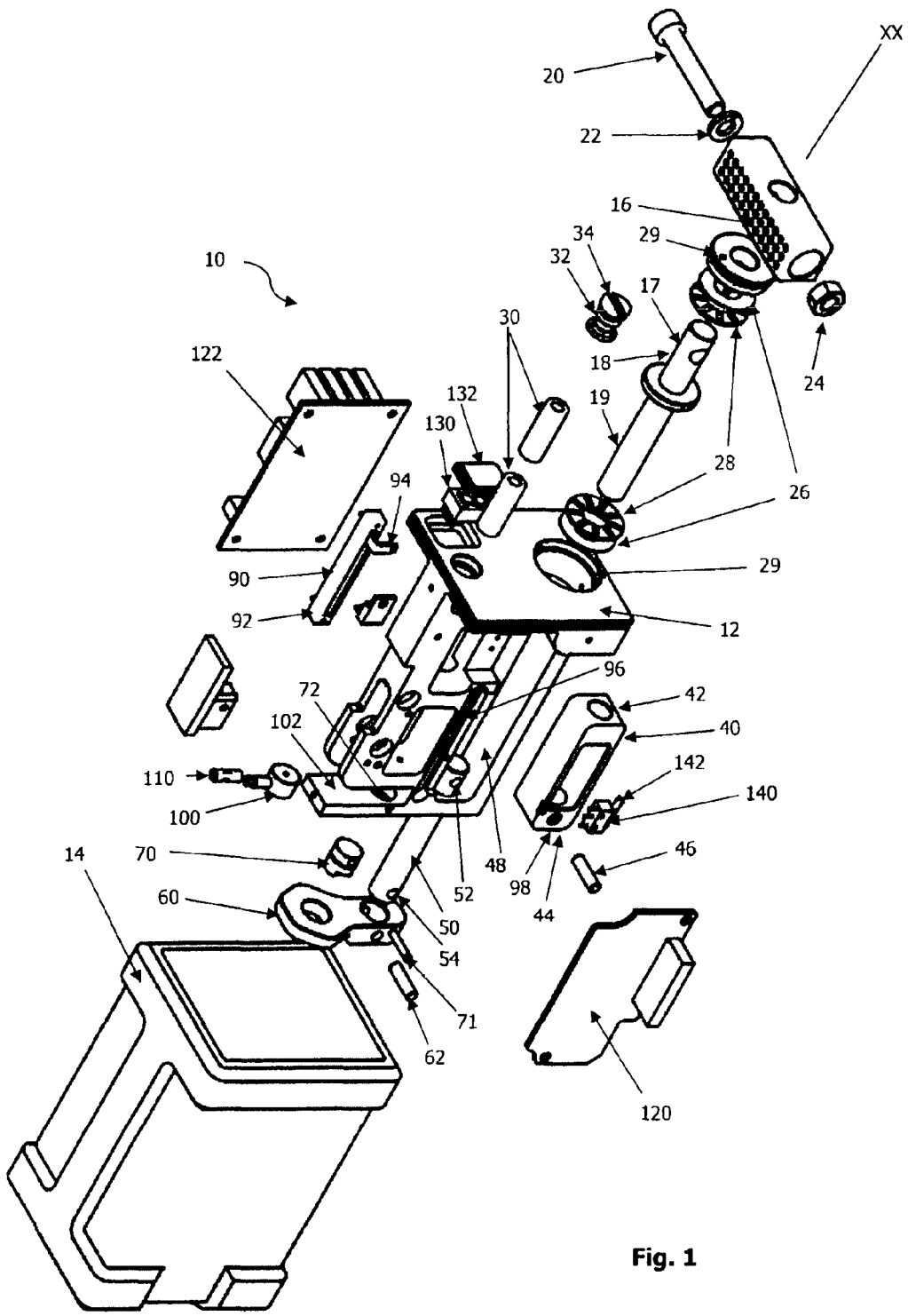
FIG. 1 is an exploded assembly view of a portable pressure detection device.
Figure 2:
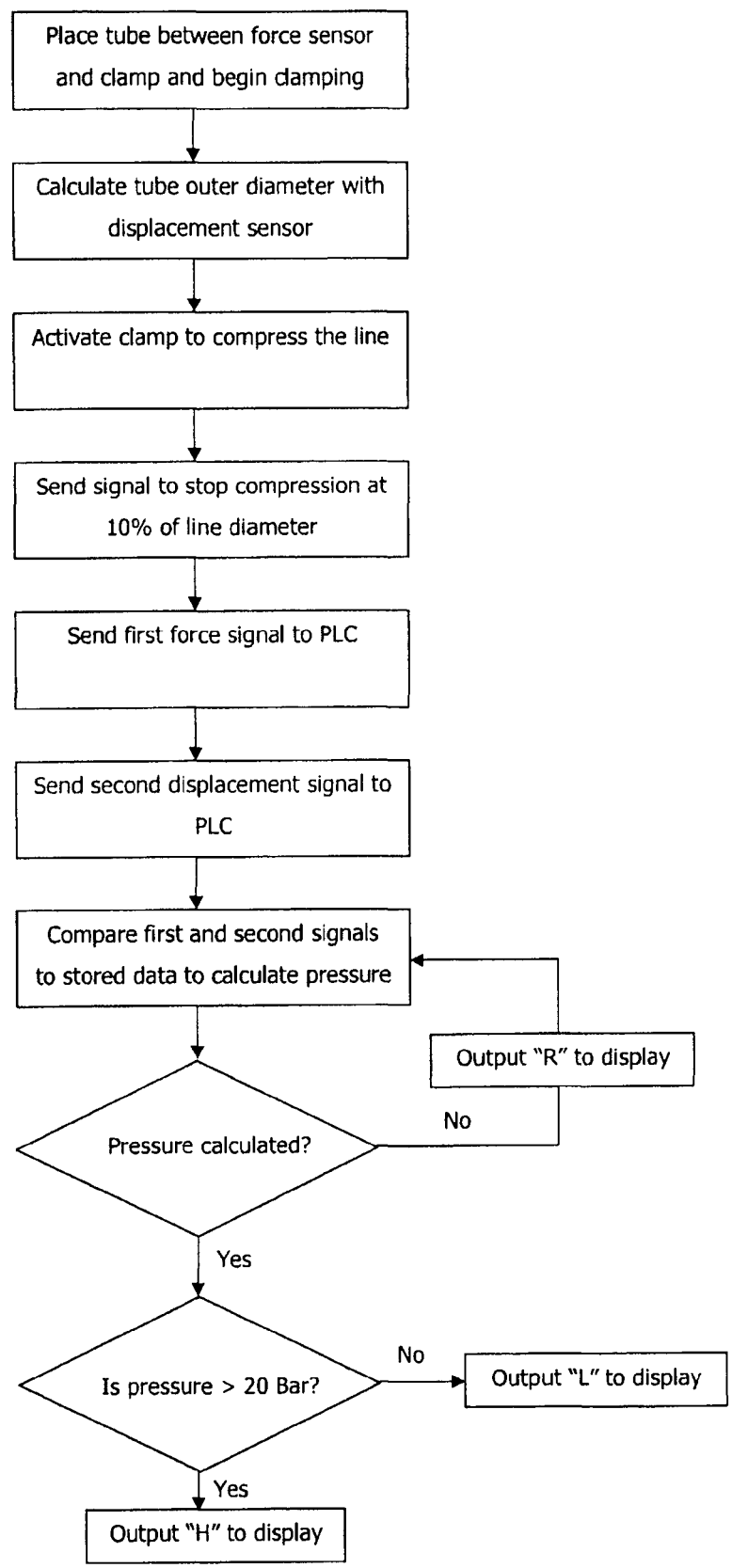
FIG. 2 is a flow diagram showing a pressure testing process.

A portable, hand held pressure detection device 10 is depicted in FIG. 1. The device 10 includes a manifold or frame 12. The manifold 12 supports the mechanical and electrical components of the device 10 and is mounted within a rigid casing 14. The casing 14 can be manufactured from stainless steel, plastic, aluminium or other suitable engineering materials.

The casing 14 is hand held and portable. The casing 14 has a concave face with respect to the hose clamp that will divert the jet of oil away from the operator in case of an unlikely event of a hose 11 burst. The casing 14 may be made in various sizes to accommodate different sized hydraulic lines 11. Generally the casing is a hand held unit, which is portable.

The device 10 includes a handle 16 which is connected to a proximal end 17 of a shaft or screw 18 projecting out of the casing 14. As depicted in FIG. 1, the handle 16 is connected to the screw 18 with a bolted assembly consisting of a threaded bolt 20, a spring washer 22 and a nut 24.

The screw 18 is mounted on the manifold 12 with two thrust washers 26 and two thrust radial bearings 28. The bearings 28 enable the handle 16 and screw 18 to rotate relative to the manifold 12. The device 10 includes a puller nut 29 having a threaded connection with the manifold 12. The puller nut 29 holds the screw 18 in a precise location, while permitting the screw 18 to rotate.

Two batteries 30 are mounted within the manifold 12 to power the electric components of the device 10. The batteries 30 are covered with a battery plug 32 with a screwdriver engagement slot 34. The battery plug 32 secures the batteries 30 in position and protects them from moisture ingression.

A puller block 40 is mounted within the manifold 12. The puller block 40 has a first end 42 with a threaded hole for receiving the distal end 19 of the screw 18. The puller block 40 has a second end 44 with a hole for receiving the proximal end 52 of a clamp shaft 50. The clamp shaft 50 is secured to the puller block 40 with a pin 46. The puller block 40 has a generally rectangular cross-sectional profile, and the puller block 40 fits into a corresponding slot 48 formed in the manifold 12. On account of the engagement between the side walls of the puller block 40 and the manifold 12, the puller block 40 is prevented from rotating with the screw 18. Accordingly, when the screw 18 rotates in response to a user turning the handle 16, the puller block 40 slides within the manifold 12, along the longitudinal axis XX of the shaft 18.

The distal end 54 of the clamp shaft 50 is connected to a clamp plate 60 with a pin 62. Rotation of the handle 16 causes the puller block 40 to move longitudinally along the axis XX, which in turn results in longitudinal motion of the clamp shaft 50 and the clamp plate 60.

On account of the right handed thread of the shaft 18, clockwise rotation of the handle 16 moves the clamp plate 16 towards the manifold 12, and anti-clockwise rotation of the handle 16 moves the clamp plate 16 away from the manifold 12.

Figure 3:
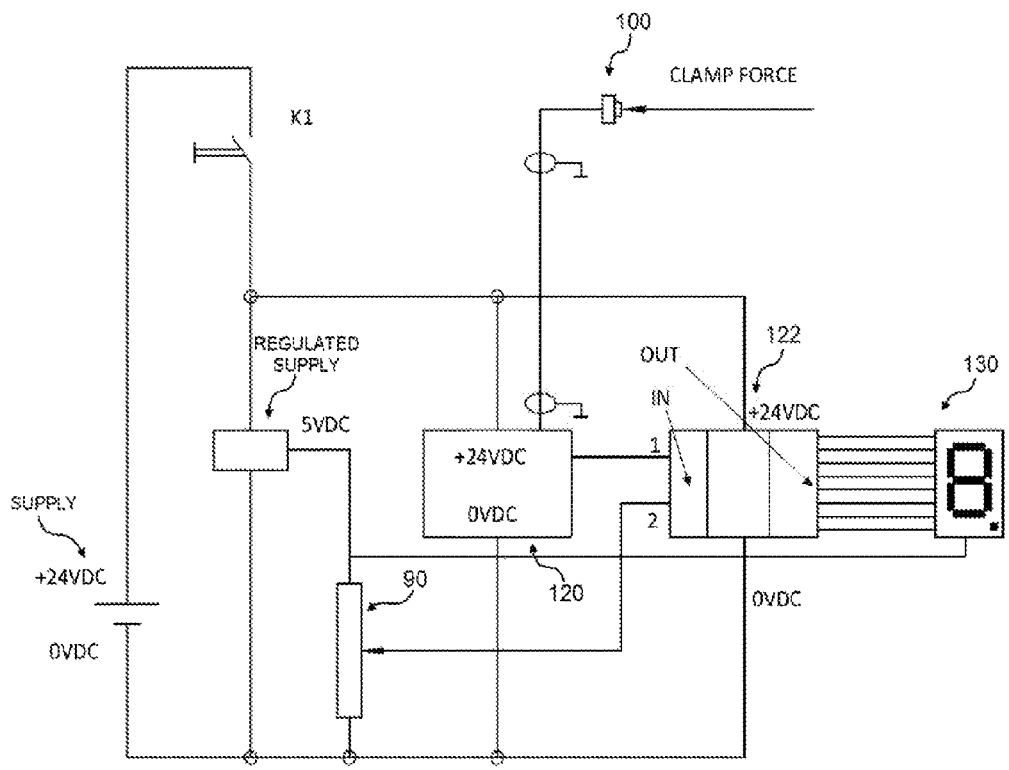
FIG. 3 is an electrical circuit diagram.
Figure 4:
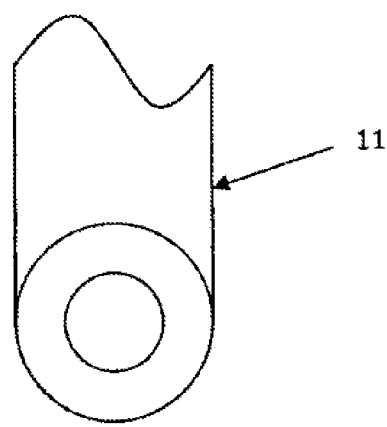
FIG. 4 is a schematic view of a portion of a hydraulic line.

A simplified circuit diagram is shown in FIG. 3. The device 10 includes a probe 70 which is seated in a circular hole 72 formed on the manifold 12, and free to move within the hole 72, but prevented from passing through the hole 72, on account of a step change in diameter of the probe 70. The device 10 includes a screw 71 mounted on the manifold 12 which allows precise movement of the probe 70 between two limits. The mechanical assembly of the device 10 is designed to apply a force on a hydraulic or pneumatic hose or line 11 placed between the clamp plate 60 and the probe 70.

The device 10 includes a piezoelectric transducer 100 located in a dedicated slot 102 in the manifold 12. The piezoelectric, transducer 100 abuts against the probe 70. The piezoelectric transducer 100 generates an electric potential in response to applied mechanical force on the probe 70.

A datalink processor (DLP) plug 110 communicates an electric signal from the piezoelectric transducer 100 to a DLPP board 120. The DLPP board 120 is an amplifier that converts the electric potential, preferably an electric charge into an electric signal preferably voltage proportional with the force applied by the probe 70 to the piezoelectric transducer 100. The output of the DLPP board 120 is a first voltage signal between 0 and 5 V DC.

The device 10 includes a linear potentiometer 90 having a body 92 and a sliding arm 94. The potentiometer body 92 is secured to the manifold 12 in a slot 96. The sliding arm 94 of the potentiometer 92 is connected to a recess 98 of the puller block 40. Accordingly, the sliding arm 94 moves with the puller block 40 when the handle 16 is rotated.

The linear potentiometer 90 is used as a voltage divider and measures the distance between damp plate 60 and the probe 70. The output of the linear potentiometer 90 is a second voltage signal.

The first voltage signal from the DLPP board 120 and the second voltage signal from the potentiometer 90 are connected to a programmable logic controller PLC 122. The PLC 122 has a stored internal memory or database corresponding to the internal pressure in various hydraulic tubes when a given deformation of the hydraulic tube wall occurs resulting from a given force acting on the tube wall.

This calculation is possible because, in the case of flexible conduits such as hydraulic and pneumatic hoses, the flexibility and deformability of the hose wall is proportional to the internal pressure within the hose.

The PLC 122 compares the two voltage signals with pre-recorded values in the internal memory and displays the result on a 7-segment LED display 130. The display 130 is protected against water ingress by a lens 132 mounted on the manifold 12. The LED display 130 may indicate paramaters other than the pressure within the line 11, such as the diameter of the line 11 or an indication of remaining battery power etc, or other such variables.

A micro switch 140 having a micro lever 142 is mounted to the manifold 12. The micro switch 140 powers on and off the device 10 when the puller block 40 comes into contact with the micro lever 142.

The electrical power is provided by the batteries 30. A 24V terminal 150 provides electrical contact to the micro switch 140.

The operation of the device 10 will now be described. When a user wishes to test the internal pressure within a hydraulic line 11, the user places a portion of the line 11 between the probe 70 and the clamp plate 60. The user then commences to rotate the handle 16 in a clockwise direction, which gradually reduces the distance between the clamp plate 60 and the probe 70. The movement of the puller block 40 engages the microswitch 140, causing the device 10 to power on and activating the LED display 130.

When the probe 70 and the clamp plate 60 both come into contact with the hose 11, and the initial force applied to the probe 70 reaches some predetermined level, this indicates to the PLC 120 that the space between the clamp plate 60 and the probe 70 corresponds to the starting, outer diameter of the tube 11. The PLC 120 then calibrates using a high speed counter or another such means. This is taken to be the starting position for the second voltage signal received by the potentiometer 90. The segments on the display 130 begin to light up in a clockwise pattern confirming that hose 11, probe 70 and piezoelectric transducer 100' are in contact and a force exists on the outer wall of the hose 11. At this moment the outer diameter of the hose 11 is measured by the potentiometer 90 and the value of the signal generated by the potentiometer 90 is stored in the memory of the PLC 122. A circuit diagram is included as FIG. 3.

The operator continues turning the handle 16 clockwise. The hydraulic hose is deformed between the clamp plate 60 and the probe 70. When the deformation of the hose reaches 10% of the outside diameter of the hose, the letter "S" is displayed on the LED display 130. The operator stops turning the handle. The PLC 122 then compares the first voltage signal from the DLPP board 120 and the second voltage signal from the potentiometer 90 with the data stored in the memory.

If the results of the data comparison indicate that the pressure in the line is safe, such as a pressure of less than 20 Bar, the letter "L" is displayed on the LED display 130 indicating low pressure. When the pressure is calculated to be greater than a safe level, such as more than 20 Bar, the letter "H" is displayed on the LED display 130, indicating high pressure.

In the event that the operator does not follow the procedure correctly, or an accurate reading cannot be obtained, or the pressure varies in the hose at the time of measurement around the 20 Bar value. The letter "R" is displayed indicating a repeat of the procedure is required.

The database of information can be customised to particular brands and types of hose, or simply set to generic hose specifications of a given diameter. The database can be downloaded from a website on a SD card and then placed in the portable device providing a simple automatic upgrade.

In an alternative embodiment, a magnetic sensor is used instead of the potentiometer 90 to provide accurate measurement of the distance in real time between the clamp plate 60 and the probe 70. However, it will be appreciated by a person skilled in the art that a different sensor may be used to measure the deformation, such as an angular encoder.

In an alternative embodiment, a resistive strain sensor may be used instead or in addition to the piezoelectric sensor 90 to provide accurate behaviour of the hose 11 under deformation. However, it will be appreciated by a person skilled in the art that a different PLC 122 will be used.

Some hoses 11 may become brittle being exposed to high temperature or ultraviolet radiation. In this case the deformation is stopped early in the course of measurement to prevent damaging the hose 11 being tested. This is possible by using two force sensors: one with a very dynamic output as the piezoelectric sensor 90 and one resistive strain sensor with a better static characteristic. The PLC 122 will compare these values (static and dynamic) for a better accuracy and if the dynamic value has a certain behaviour will stop the deformation before it reaches 10% displaying letter "F": Faulty Hose 11. Also having the capability to compare more parameters enables the device 10 to be used on a variety of hydraulic hoses 11 and pneumatic hoses as well without the need of a selector or operator intervention.

The device 10 may have download port such as a USB port so that information can be transmitted to a computer. Alternatively, the device 10 may utilise a Bluetooth transmitter or RFID to communicate with a computer. In this embodiment, the raw data concerning pressure and displacement may be provided to a remote computer such as a laptop computer. The laptop computer may be provided with software to estimate the internal pressure within the hydraulic hose 11, and the ability for a user to specify the hose type and other parameters. Alternatively, an updated data table may be downloaded from a computer through the download port, to accommodate different data for different hydraulic lines 11, or new data.

It will be appreciated by those skilled in the art that the clamp plate 60 may be driven by other means such as a hydraulic pump, or ratchet mechanism.

Although the invention has been described with reference to specific examples, it will be appreciated by those skilled in the art that the invention may be embodied in many other forms.

The claims defining the invention are as follows:

1. A pressure testing device for calculating a pressure in a flexible line, the device comprising:
   a housing unit;
   a force sensor mounted on the housing unit;
   a clamp assembly having a clamp mounted on the housing unit, the clamp being operable to compress the flexible line against the force sensor by a predetermined degree of deformation of the flexible line;
   a displacement sensor adapted to measure a change in an outer diameter of the flexible line after the outer diameter of the flexible line has been compressed by the clamp to the predetermined degree of deformation;
   a controller having:
      i) a processor in communication with the force sensor and the displacement sensor;
      ii) a non-transitory memory containing stored data;
   wherein at the predetermined degree of deformation of the flexible line, the processor compares a force signal from the force sensor and a displacement signal from the displacement sensor with the stored data to determine the pressure within the flexible line; and
   an output device, coupled to the controller, wherein the controller is adapted to send an output signal to the output device, and wherein the output device is configured to provide a first output corresponding to a first pressure, a second output corresponding to a second pressure, and a third output corresponding to an error, indicating that retesting is required, based on the output signal,
   wherein the first output indicates that it is safe to decouple the flexible line, wherein the second output indicates that it is unsafe to decouple the flexible line, and wherein the flexible line is decoupled based on the first output.

2. The pressure testing device of claim 1, wherein the force sensor includes a probe coupled with a transducer.

3. The pressure sensor of claim 2, wherein the transducer is a piezoelectric transducer.

4. The pressure testing device of claim 2, wherein the transducer is in communication with an amplifier which converts an electric charge into an electric signal, proportional to a force applied to the probe.

5. The pressure testing device of claim 4, wherein the amplifier is in communication with the controller.

6. A pressure testing device of claim 1, wherein the displacement sensor includes a linear potentiometer.

7. The pressure testing device of claim 6, wherein the linear potentiometer includes a body mounted on the housing unit, and a sliding arm in engagement with a moving portion of the clamp.

8. The pressure testing device of claim 7, wherein the linear potentiometer acts as a voltage divider to measure the distance between clamp and the probe.

9. The pressure testing device of claim 1, wherein the predetermined degree of deformation of the flexible line is about 10 percent of the outer diameter of the flexible line.

10. The pressure testing device of claim 1, wherein the clamp assembly includes:
   a shaft having proximal and distal ends;
   a handle connected to the proximal end; and
   a clamp plate connected to the distal end,
   wherein the handle is rotatable to selectively vary the distance between the clamp plate and the force sensor.

11. The pressure testing device of claim 10, wherein the shaft includes a primary shaft and a secondary shaft, the primary shaft extending between the handle and a puller block, and the secondary shaft extending between the puller block and the clamp plate.

12. The pressure testing device of claim 11, wherein the primary shaft is threadingly connected to the puller block such that rotation of the handle causes the puller block to move longitudinally within the housing unit.

13. The pressure testing device of claim 12, wherein the sliding arm is in engagement with the puller block.

14. The pressure testing device of claim 11, further comprising a micro-switch in contact with the puller block, the micro-switch being adapted to turn on the device when the puller block moves longitudinally.

15. The pressure testing device of claim 1 further comprising a second force sensor mounted on the housing unit.

16. The pressure testing device of claim 15, wherein the second force sensor is a resistive strain sensor.

17. A method of calculating a pressure in a flexible line, the method including the steps of:
   calculating an outer diameter of the flexible line with a displacement sensor;
   compressing the line with a clamp against a force sensor by a predetermined degree of deformation of the flexible line;
   sending a force signal from the force sensor to a controller based on a measured force acting on an outer wall of the flexible line, wherein the controller comprises: i) a processor in communication with the force sensor and the displacement sensor, and ii) a non-transitory memory containing stored data;
   sending a displacement signal from the displacement sensor to the controller based on a measured change in an outer diameter of the flexible line after the outer diameter of the flexible line has been compressed by the clamp to the predetermined degree of deformation;
   comparing, by the controller, the force signal and the displacement signal with the stored data to determine an internal pressure within the flexible line;
   sending, by the controller, an output signal to a display device based on the determined internal pressure;
   outputting, by the display device, an indication of the determined internal pressure; and
   decoupling the flexible line based on the indication of the determined internal pressure.

18. The method of claim 17, wherein the step of compressing the line includes a user manually actuating the clamp.

19. The method of claim 18, further including the step of sending an output to the user to indicate when the predetermined degree of deformation has occurred.

20. The method of claim 19, wherein the predetermined degree of deformation is about 10 percent of the outer diameter of the flexible line.

21. A pressure testing device for calculating a pressure in a flexible line, the device comprising:
   a housing unit;
   a force sensor mounted on the housing unit;
   a clamp assembly having a clamp mounted on the housing unit, the clamp being operable to compress the flexible line against the force sensor by a predetermined degree of deformation of the flexible line;
   a displacement sensor adapted to measure a change in an outer diameter of the flexible line after the outer diameter of the flexible line has been compressed by the clamp to the predetermined degree of deformation;
   a controller having:
      i) a processor in communication with the force sensor and the displacement sensor;
      ii) a non-transitory memory containing stored data;
   wherein at the predetermined degree of deformation of the flexible line, the processor compares a force signal from the force sensor and a stop signal from the displacement sensor with the stored data to determine an internal pressure within the flexible line; and
   an output device in communication with the controller, wherein the controller is adapted to send an output signal to the output device, and wherein the output device is configured to provide a first output corresponding to a safe internal pressure and a second output corresponding to an unsafe internal pressure based on the output signal,
   wherein the first output indicates that it is safe to decouple the flexible line, wherein the second output indicates that it is unsafe to decouple the flexible line, and wherein the flexible line is decoupled based on the first output.

22. A pressure testing device for calculating a pressure in a flexible line, the device comprising:
   a housing unit;
   a force sensor mounted on the housing unit;
   a clamp assembly having a clamp mounted on the housing unit, the clamp being operable to compress the flexible line against the force sensor by a predetermined degree of deformation of the flexible line;
   a displacement sensor adapted to measure a change in an outer diameter of the flexible line after the outer diameter of the flexible line has been compressed by the clamp to the predetermined degree of deformation;
   a controller having:
      i) a processor in communication with the force sensor and the displacement sensor;
      ii) a non-transitory memory containing stored data;
   wherein at the predetermined degree of deformation of the flexible line, the processor compares a force signal from the force sensor and a displacement signal from the displacement sensor with the stored data to determine an internal pressure within the flexible line and produce an output signal; and
   an output device configured to receive the output signal from the processor and to output an indication of the determined internal pressure based on the output signal, wherein the flexible line is decoupled based on the indication of the determined internal pressure.

* * * * *